(12) United States Patent
Brown et al.

(10) Patent No.: US 9,463,993 B2
(45) Date of Patent: Oct. 11, 2016

(54) GLASS RIBBON ENGAGEMENT SYSTEM WHICH INCLUDES A ROBOT TOOLING DEVICE AND A GUIDANCE DEVICE

(71) Applicant: CORNING INCORPORATED, Corning, NY (US)

(72) Inventors: James William Brown, Painted Post, NY (US); Shawn Rachelle Markham, Harrodsburg, KY (US); Naiyue Zhou, Painted Post, NY (US); Zepei Zhu, Corning, NY (US)

(73) Assignee: Corning Incorporated, Corning, NY (US)

( * ) Notice: Subject to any disclaimer, the term of this patent is extended or adjusted under 35 U.S.C. 154(b) by 78 days.

(21) Appl. No.: 14/382,907

(22) PCT Filed: Mar. 7, 2013

(86) PCT No.: PCT/US2013/029509
§ 371 (c)(1),
(2) Date: Sep. 4, 2014

(87) PCT Pub. No.: WO2013/134461
PCT Pub. Date: Sep. 12, 2013

(65) Prior Publication Data
US 2014/0373572 A1    Dec. 25, 2014

Related U.S. Application Data

(60) Provisional application No. 61/608,952, filed on Mar. 9, 2012, provisional application No. 61/608,405, filed on Mar. 8, 2012.

(51) Int. Cl.
| | | |
|---|---|---|
| *C03B 35/00* | (2006.01) | |
| *C03B 33/02* | (2006.01) | |
| *B25J 15/00* | (2006.01) | |
| *C03B 18/04* | (2006.01) | |
| *C03B 21/00* | (2006.01) | |

(52) U.S. Cl.
CPC .............. *C03B 35/005* (2013.01); *B25J 15/00* (2013.01); *C03B 18/04* (2013.01); *C03B 21/00* (2013.01); *C03B 33/0215* (2013.01); *B65G 2249/04* (2013.01); *C03B 2225/02* (2013.01)

(58) Field of Classification Search
CPC ..... C03B 32/005; C03B 18/04; C03B 21/00; C03B 33/0215; C03B 2225/02; B65G 2249/04
See application file for complete search history.

(56) References Cited

U.S. PATENT DOCUMENTS 3,693,321 A * 9/1972 Nilsson ................... B65B 23/20
414/789.5
4,667,555 A * 5/1987 Lisec .................... C03B 33/027
83/319

(Continued)

FOREIGN PATENT DOCUMENTS

| EP | 2177482 | 3/2011 | ........... C03B 33/033 |
| WO | WO2007053265 | 5/2007 | ............. C03B 37/02 |

*Primary Examiner* — Queenie Dehghan
(74) *Attorney, Agent, or Firm* — Thomas R. Beall; Ryan T. Hardee

(57) ABSTRACT

A glass ribbon engagement system is described herein that includes a robot tooling device with suction cups configured to engage a first side of a glass ribbon, and a guidance device with one or more devices (e.g., air nozzles, cylinder-wheel units) which are configured to apply one or more local forces to a second side of the glass ribbon to shift the glass ribbon towards the suction cups to assist the suction cups in engaging and securing the first side of the glass ribbon.

19 Claims, 13 Drawing Sheets

(56) References Cited

U.S. PATENT DOCUMENTS

| | | |
|---|---|---|
| 5,871,134 A | 2/1999 | Komagata et al. ............... 225/2 |
| 7,260,959 B2 | 8/2007 | Chang et al. .................. 65/25.1 |
| 8,051,681 B2 * | 11/2011 | Dahroug ............. C03B 33/0215<br>65/174 |
| 2007/0095108 A1 | 5/2007 | Kirby et al. .................... 65/475 |
| 2009/0092472 A1 | 4/2009 | Luo et al. .................. 414/752.1 |
| 2011/0094267 A1 * | 4/2011 | Aniolek ................ C03B 17/064<br>65/91 |
| 2012/0048905 A1 * | 3/2012 | Kudva .................... B26F 3/002<br>225/2 |
| 2012/0144864 A1 * | 6/2012 | Tsuda .................... C03B 17/068<br>65/53 |

* cited by examiner

GLASS RIBBON ENGAGEMENT SYSTEM WHICH INCLUDES A ROBOT TOOLING DEVICE AND A GUIDANCE DEVICE

CLAIM OF PRIORITY

This application claims the benefit of U.S. Provisional Application Ser. No. 61/608,952 filed on Mar. 9, 2012 and U.S. Provisional Ser. No. 61/608,405, filed on Mar. 8, 2012, the entire contents of which are hereby incorporated by reference herein.

TECHNICAL FIELD

The present invention relates in general to a glass ribbon engagement system that includes a robot tooling device with suction cups configured to engage a first side of a glass ribbon, and a guidance device with one or more devices (e.g., air nozzles, cylinder-wheel units) which are configured to apply one or more local forces to a second side of the glass ribbon to shift the glass ribbon towards the suction cups to assist the suction cups in engaging and securing the first side of the glass ribbon.

BACKGROUND

Manufacturers of glass sheets (e.g., LCD glass sheet) that can be used in devices like flat panel displays are constantly trying to enhance their glass manufacturing systems to improve the production of glass sheets. One way to enhance the glass manufacturing system to improve how a portion of a glass ribbon can be engaged and secured before being scored and separated from the remaining glass ribbon is the subject of the present invention.

SUMMARY

A glass ribbon engagement system, a method for engaging and securing a glass ribbon, a guidance device, a glass manufacturing system, and a method for producing a glass sheet are described in the independent claims of the present application. Advantageous embodiments of the glass ribbon engagement system, the method for engaging and securing a glass ribbon, the guidance device, the glass manufacturing system, and the method for producing a glass sheet are described in the dependent claims.

In one aspect, the present invention provides a glass ribbon engagement system that engages and secures a glass ribbon. The glass ribbon engagement system comprises: (a) a robot tooling device that includes a plurality of suction cups configured to engage a first side of the glass ribbon; and (b) a guidance device that includes a support stand and one or more devices which are secured to the support stand, where the one or more devices are positioned and configured to apply one or more local forces to a second side of the glass ribbon to shift the glass ribbon towards the suction cups to assist the suction cups in engaging and securing the first side of the glass ribbon.

In another aspect, the present invention provides a method for engaging and securing a glass ribbon. The method comprising the steps of: (a) activating a robot tooling device that includes a plurality of suction cups in a manner such that the suction cups engage a first side of the glass ribbon; and (b) activating a guidance device that includes a support stand and one or more devices which are secured to the support stand in a manner where the one or more devices apply one or more local forces to a second side of the glass ribbon to shift the glass ribbon towards the suction cups to assist the suction cups in engaging and securing the first side of the glass ribbon.

In yet another aspect, the present invention provides a guidance device that shifts a glass ribbon. The guidance device comprises: (a) a support stand; (b) one or more devices, secured to the support stand, where the one or more devices are positioned and configured to apply one or more local forces to a side of the glass ribbon to shift the glass ribbon from a first position to a second position; and (c) a control unit configured to activate the one or more devices to apply the one or more local forces to the side of the glass ribbon to shift the glass ribbon from the first position to the second position.

In still yet another aspect, the present invention provides a glass manufacturing system comprising: (a) at least one vessel for melting batch materials and forming molten glass; (b) a forming vessel for receiving the molten glass and forming a glass ribbon; (c) a pull roll assembly for drawing the glass ribbon; (d) a traveling anvil machine for receiving the glass ribbon; and (e) a glass ribbon engagement system that engages and secures the glass ribbon downstream from the traveling anvil machine. The glass ribbon engagement system comprises: (i) a robot tooling device that includes a plurality of suction cups configured to engage a first side of the glass ribbon; and (ii) a guidance device that includes a support stand and one or more devices which are secured to the support stand, where the one or more devices are positioned and configured to apply one or more local forces to a second side of the glass ribbon to shift the glass ribbon towards the suction cups to assist the suction cups in engaging and securing the first side of the glass ribbon, where after the suction cups have engaged and secured the first side of the glass ribbon then the traveling anvil machine scores the glass ribbon and the robot tooling device separates the secured glass ribbon from a remaining portion of the glass ribbon.

In still yet another aspect, the present invention provides a method for producing a glass sheet. The method comprising the steps of: (a) melting batch materials to form molten glass; (b) processing the molten glass to form a glass ribbon; (c) drawing the glass ribbon; (d) activating a robot tooling device that includes a plurality of suction cups in a manner such that the suction cups engage a first side of the drawn glass ribbon; (e) activating a guidance device that includes a support stand and one or more devices which are secured to the support stand in a manner where the one or more devices apply one or more local forces to a second side of the drawn glass ribbon to shift the drawn glass ribbon towards the suction cups to assist the suction cups in engaging and securing the first side of the drawn glass ribbon; (f) scoring the drawn glass ribbon upstream from the robot tooling device after the suction cups have engaged and secured the first side of the drawn glass ribbon; and (g) separating the secured glass ribbon from a remaining portion of the glass ribbon by using the robot tooling device.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be had by reference to the following detailed description when taken in conjunction with the accompanying drawings wherein.

DETAILED DESCRIPTION

Figure 1A:
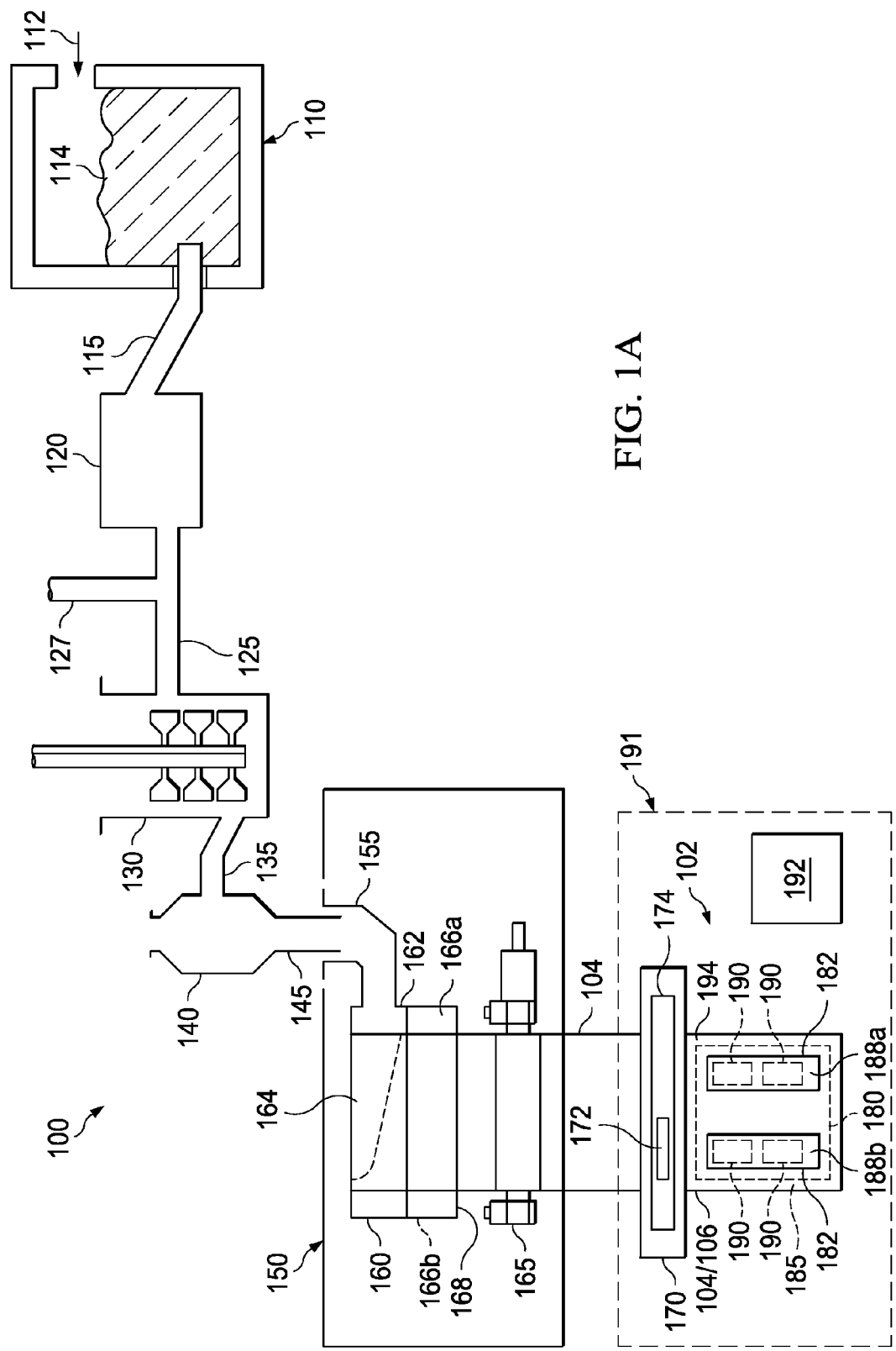
FIGS. 1A-1B are schematics of an exemplary glass manufacturing system which includes a glass ribbon engagement system in accordance with an embodiment of the present invention.
Figure 1B:
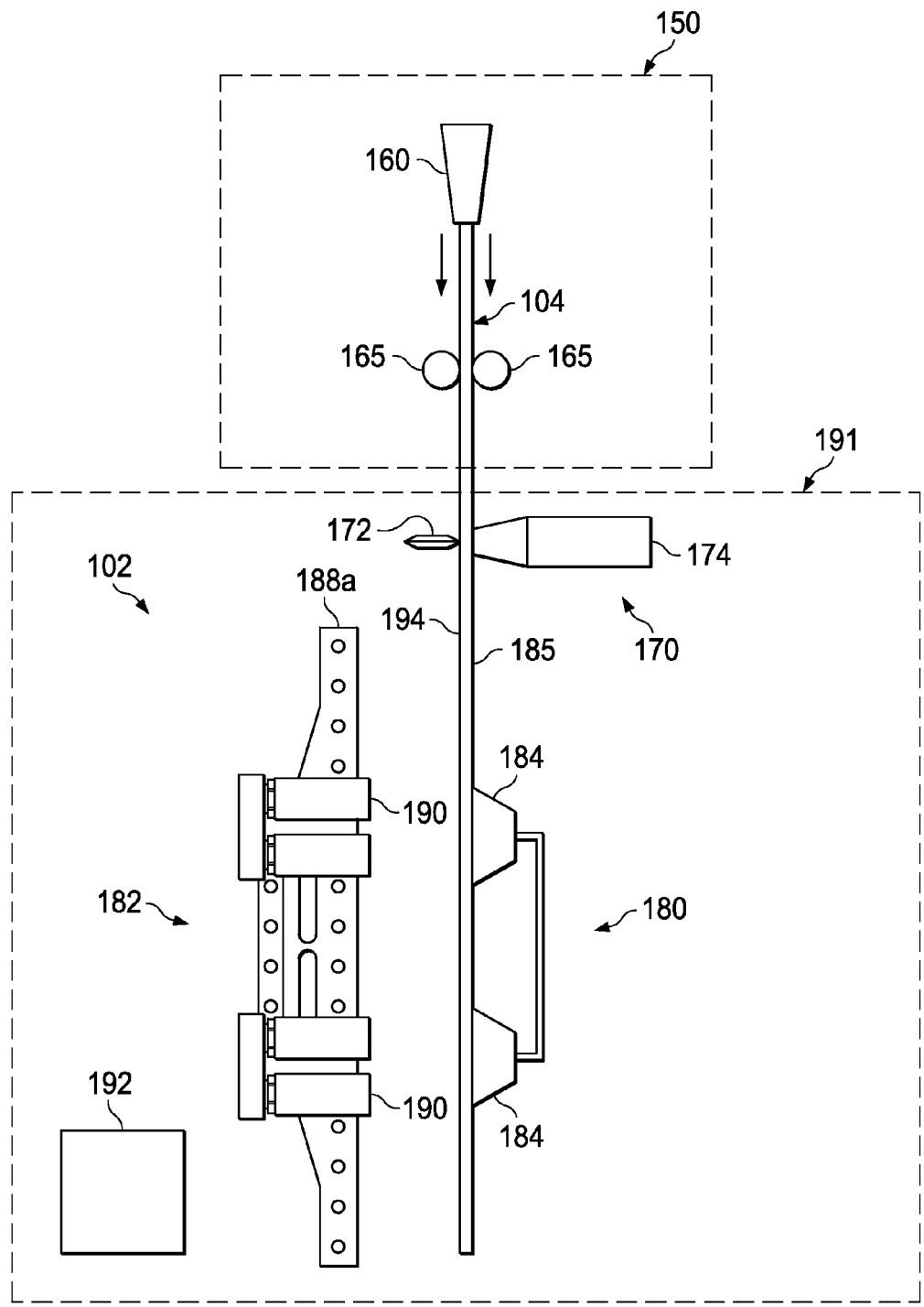

Referring to FIGS. 1A-1B, there are schematics of an exemplary glass manufacturing system 100 which includes a glass ribbon engagement system 102 configured to engage and secure a glass ribbon 104 in accordance with an embodiment of the present invention. As shown in FIG. 1A, the glass manufacturing system 100 includes a melting vessel 110, a melting to fining tube 115, a fining vessel 120, a finer to stir chamber tube 125 (with a level probe stand pipe 127 extending therefrom), a stir chamber 130 (e.g., mixing vessel 130), a stir chamber to bowl connecting tube 135, a bowl 140 (e.g., delivery vessel 140), a downcomer 145, a fusion draw machine (FDM) 150 (which includes an inlet 155, a forming apparatus 160, and a pull roll assembly 165), a traveling anvil machine (TAM) 170, and the glass ribbon engagement system 102.

The melting vessel 110 is where glass batch materials are introduced as shown by arrow 112 and melted to form molten glass 114. The fining vessel 120 (e.g., finer tube 120) is connected to the melting vessel 110 by the melting to fining tube 115. The fining vessel 120 has a high temperature processing area that receives the molten glass 114 (not shown at this point) from the melting vessel 110 and in which bubbles are removed from the molten glass 114. The fining vessel 120 is connected to the stir chamber 130 by the finer to stir chamber connecting tube 125. The stir chamber 130 is connected to the bowl 140 by the stir chamber to bowl connecting tube 135. The bowl 140 delivers the molten glass 114 (not shown) through the downcomer 145 into the FDM 150.

The FDM 150 includes the inlet 155, the forming vessel 160 (e.g., isopipe 160), and the pull roll assembly 165. The inlet 155 receives the molten glass 114 (not shown) from the downcomer 145 and from the inlet 155 the molten glass 114 (not shown) then flows to the forming vessel 160. The forming vessel 160 includes an opening 162 that receives the molten glass 114 (not shown) which flows into a trough 164 and then overflows and runs down two opposing sides 166*a* and 166*b* before fusing together at a root 168 to form a glass ribbon 104. The pull roll assembly 165 delivers the drawn glass ribbon 104 which, at this point in the process, is substantially flat but later in the process typically develops a slightly curved/bowed shape across the glass ribbon 104. This bowed shape may remain in the glass ribbon 104 all the way to the TAM 170. The TAM 170 has a mechanical scoring device 172 (e.g., scoring wheel 172) and a nosing device 174 which are used to mechanically score the drawn glass ribbon 104 so it can then be separated into distinct pieces of glass sheets 106. Prior to the TAM 112 scoring the glass ribbon 104, the glass ribbon engagement system 102 is used to engage, secure, and flatten the glass ribbon 104 so the secured glass ribbon 104 can be effectively scored and separated from the remaining portion of the glass ribbon 104 to form a distinct glass sheet 106. The TAM 112 and the glass ribbon engagement system 102 are located in an area referred to herein as a bottom of the draw 191 (BOD 191).

As shown in FIG. 1B, there is a schematic of a part of the glass manufacturing system 100 showing a side view of the manufacturing process which includes the forming vessel 160, the pull roll assembly 165, the TAM 170 and the glass ribbon engagement system 102. The glass ribbon engagement system 102 includes a robot tooling device 180 and a guidance device 182. The robot tooling device 180 has suction cups 184 (e.g., four suction cups 184) which are configured to engage a first side 185 of the glass ribbon 104. The guidance device 182 includes a first support stand 188*a* which has attached thereto one or more devices 190 (e.g., two devices 190), a second stand 188*b* which has attached thereto one or more devices 190 (e.g., two devices 190), and a control unit 192 (see FIG. 1A's second stand 188*b*). The devices 190 are positioned and configured to apply one or more local forces to a second side 194 of the glass ribbon 104 to shift the glass ribbon 104 towards the suction cups 184 to assist the suction cups 184 in engaging and securing the first side 185 of the glass ribbon 104. The control unit 192 is configured to activate the devices 190 to apply the local forces to the second side 194 of the glass ribbon 104 when the robot tooling device 180 moves towards the first side 185 of the glass ribbon 104. Once, the suction cups 106 have engaged, secured, and side tensioned the first side 185 of the glass ribbon 104 with the aid of the guidance device 182 then the TAM 170 is activated where the mechanical scoring device 172 moves to score the glass ribbon 104 so the secured glass ribbon 104 can be separated from the remaining portion of the glass ribbon 104 through bending by the robot tooling device 180 to produce the individual glass sheet 106. A detailed discussion about two exemplary embodiments of the glass ribbon engagement system 102 is provided next with respect to FIGS. 2-3.

Referring to FIGS. 2A-2G, there are various diagrams used to help explain one embodiment of the glass ribbon engagement system 102' in accordance with the present invention. In this embodiment, the glass ribbon engagement system 102' includes a robot tooling device 180' and a guidance device 182' (e.g., see FIG. 2A's side view and FIG. 2B's top view—which illustrate a point in time where the glass ribbon 104 has not yet been engaged by the robot tooling device 180' and the guidance device 182' is not activated). The robot tooling device 180' has suction cups 184' (e.g., four suction cups 184') which are configured to engage a first side 185 of the glass ribbon 104. The guidance device 182' includes a first support stand 188*a*' (which has attached thereto one or more nozzles 190'), a second stand 188*b*' (which has attached thereto one or more nozzles 190'), and a control unit 192'. The first stand 188*a*' and the second stand 188*b*' may be part of the same structure or distinct structures. In any case, there would be one or more nozzles 190' adjacent to one edge of the glass ribbon 104 and one or more nozzles 190' adjacent to another edge of the glass ribbon 104. The nozzles 190' are positioned and configured to emit gas 200 to apply one or more local forces to the second side 194 of the glass ribbon 104 to shift the glass ribbon 104 towards the suction cups 184' and assist the suction cups 184' in engaging and securing the first side 185 of the glass ribbon 104 (see FIG. 2C which illustrates the activated guidance device 182' shifting the glass ribbon 104 towards the robot tooling device 180'). The control unit 192' is configured to activate the nozzles 190' to emit the gas 200 which applies the local forces to the second side 194 of the glass ribbon 104 when the robot tooling device 180' moves towards the first side 186 of the glass ribbon 104. Once, the suction cups 184' have engaged and secured the first side 185 of the glass ribbon 104 with the aid of the guidance device 182' then if desired the suction cups 184' can apply a side tension and flatten the glass ribbon 104. At this point, the TAM 170 is activated so the mechanical scoring device 172 moves to score the glass ribbon 104 so the secured glass ribbon 104 can be separated from the remaining portion of the glass ribbon 104 through bending by the robot tooling device 180' to produce the individual glass sheet 106 (see FIG. 2D which illustrates the robot tooling device 180' handling the individual glass sheet 106).

Figure 2A:
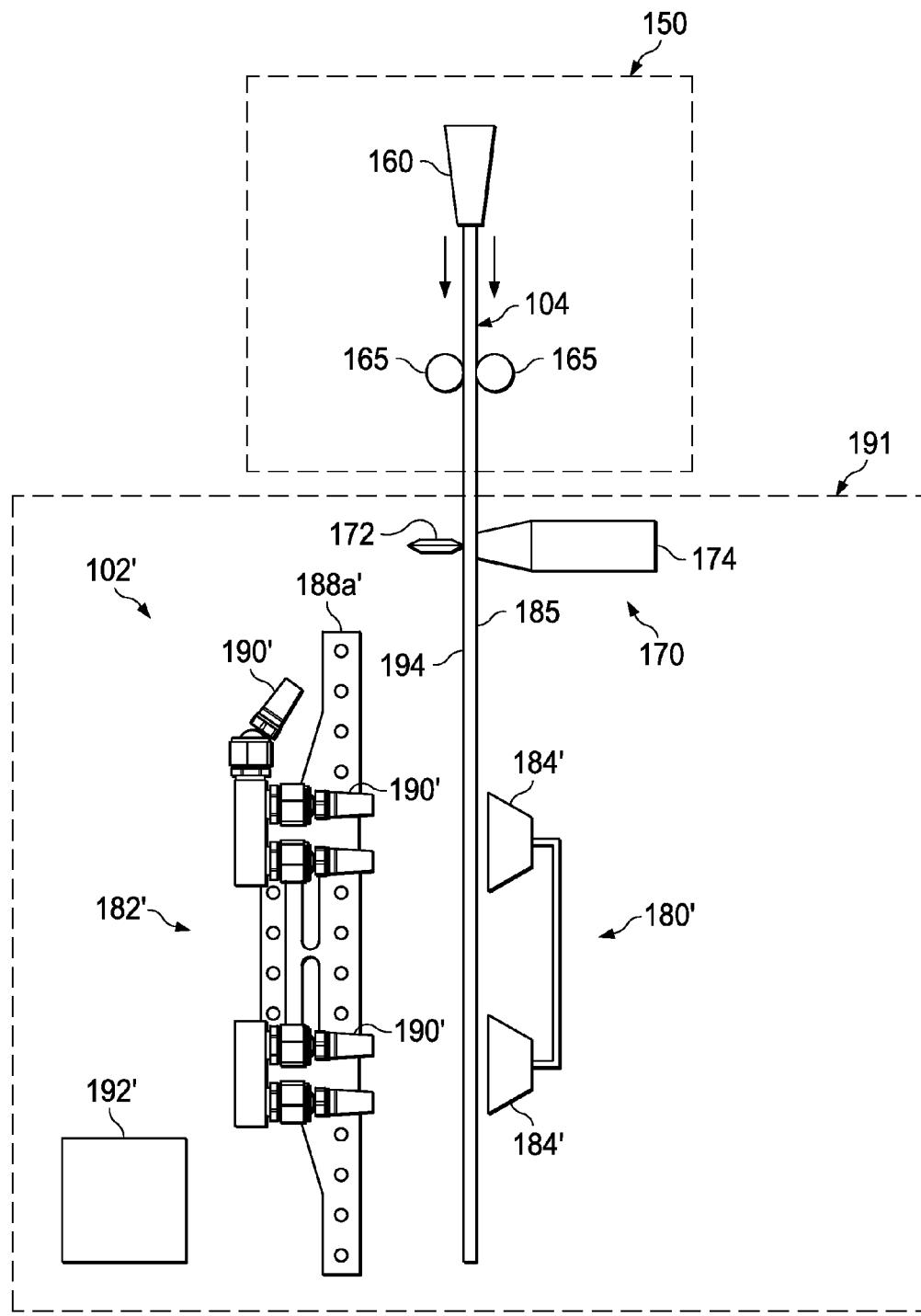
FIGS. 2A-2G are various diagrams used to help explain one embodiment of the glass ribbon engagement system shown in FIGS. 1A-1B in accordance with the present invention.
Figure 2B:
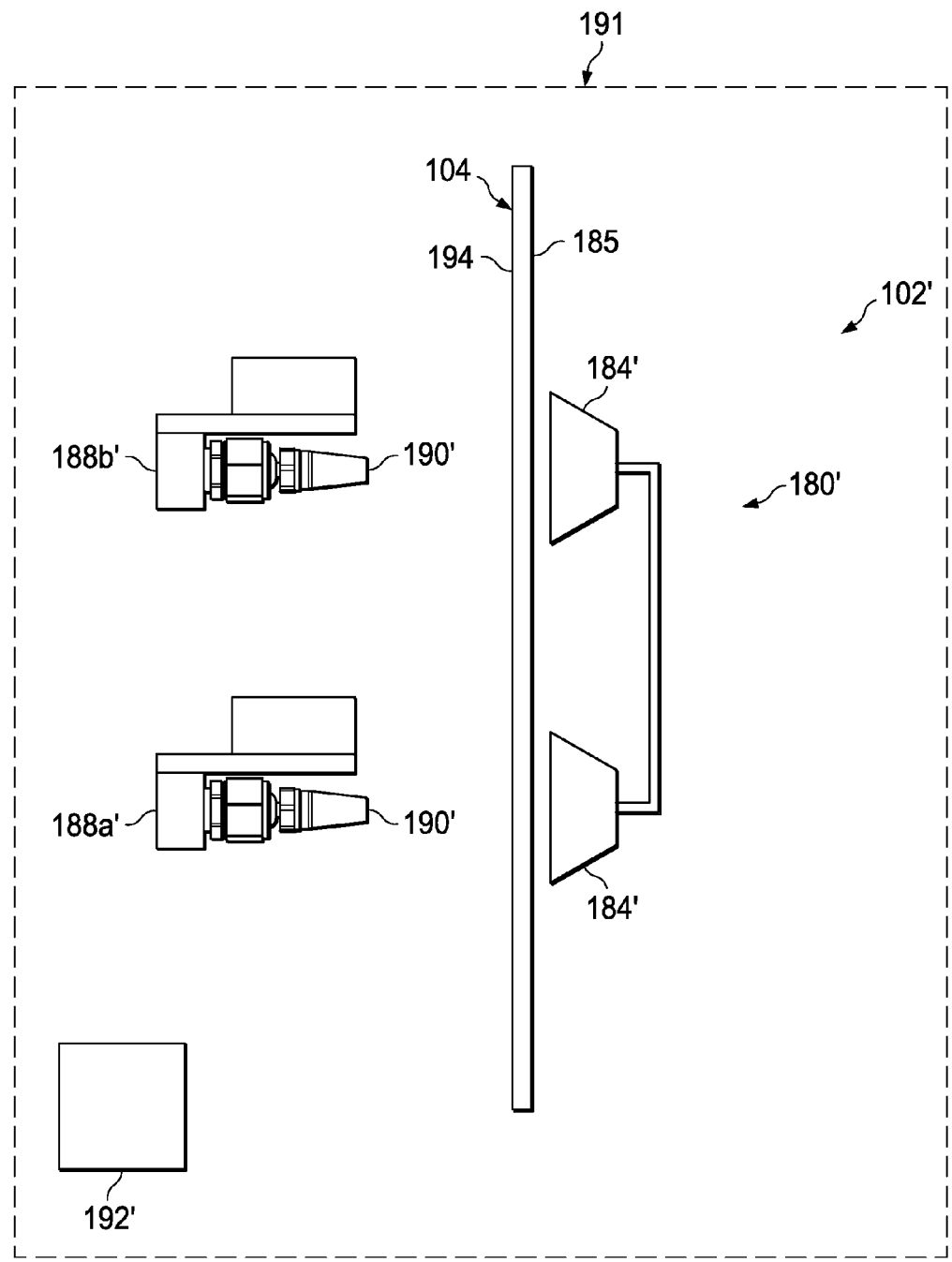
Figure 2C:
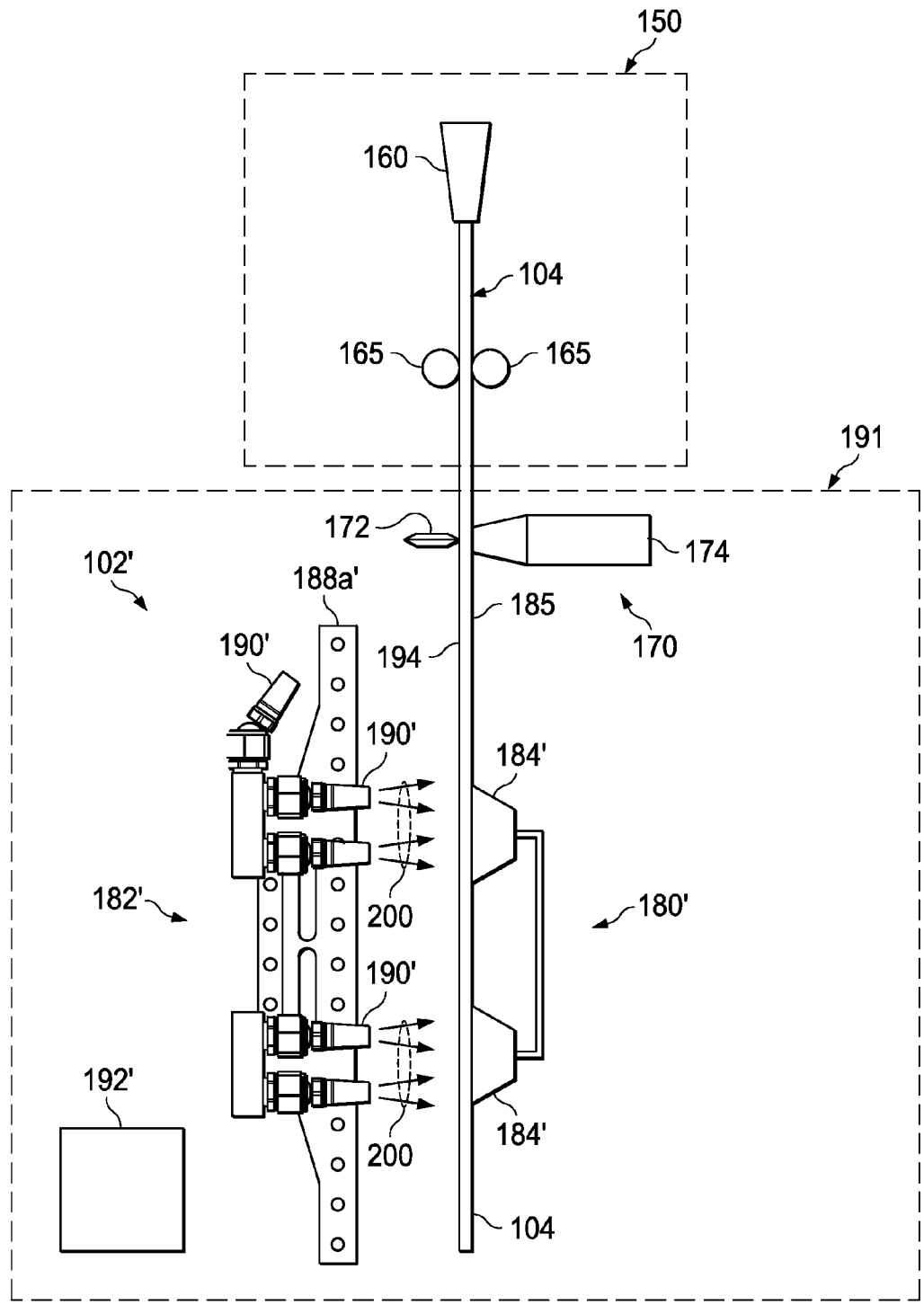
Figure 2D:
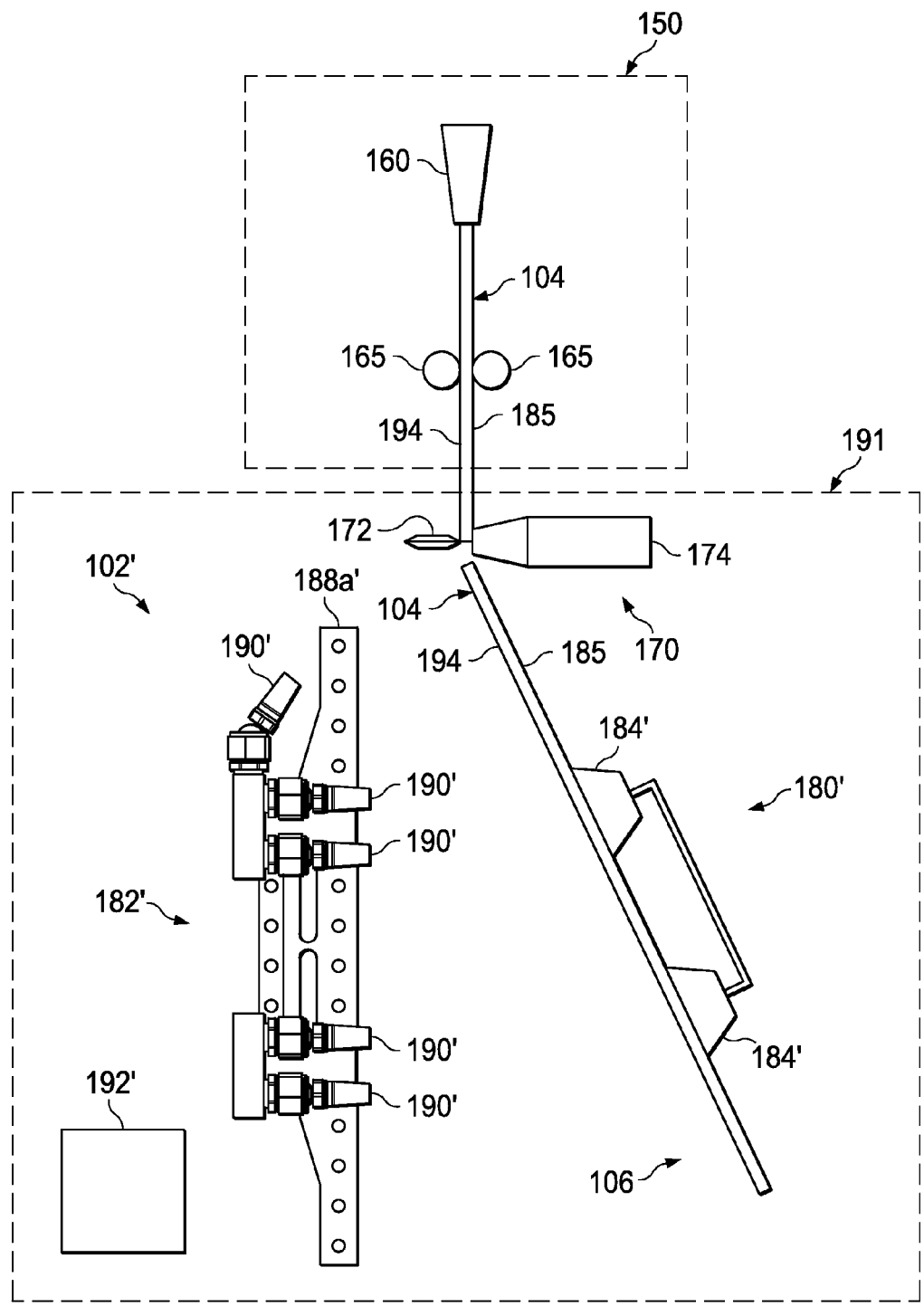
Figure 2E:
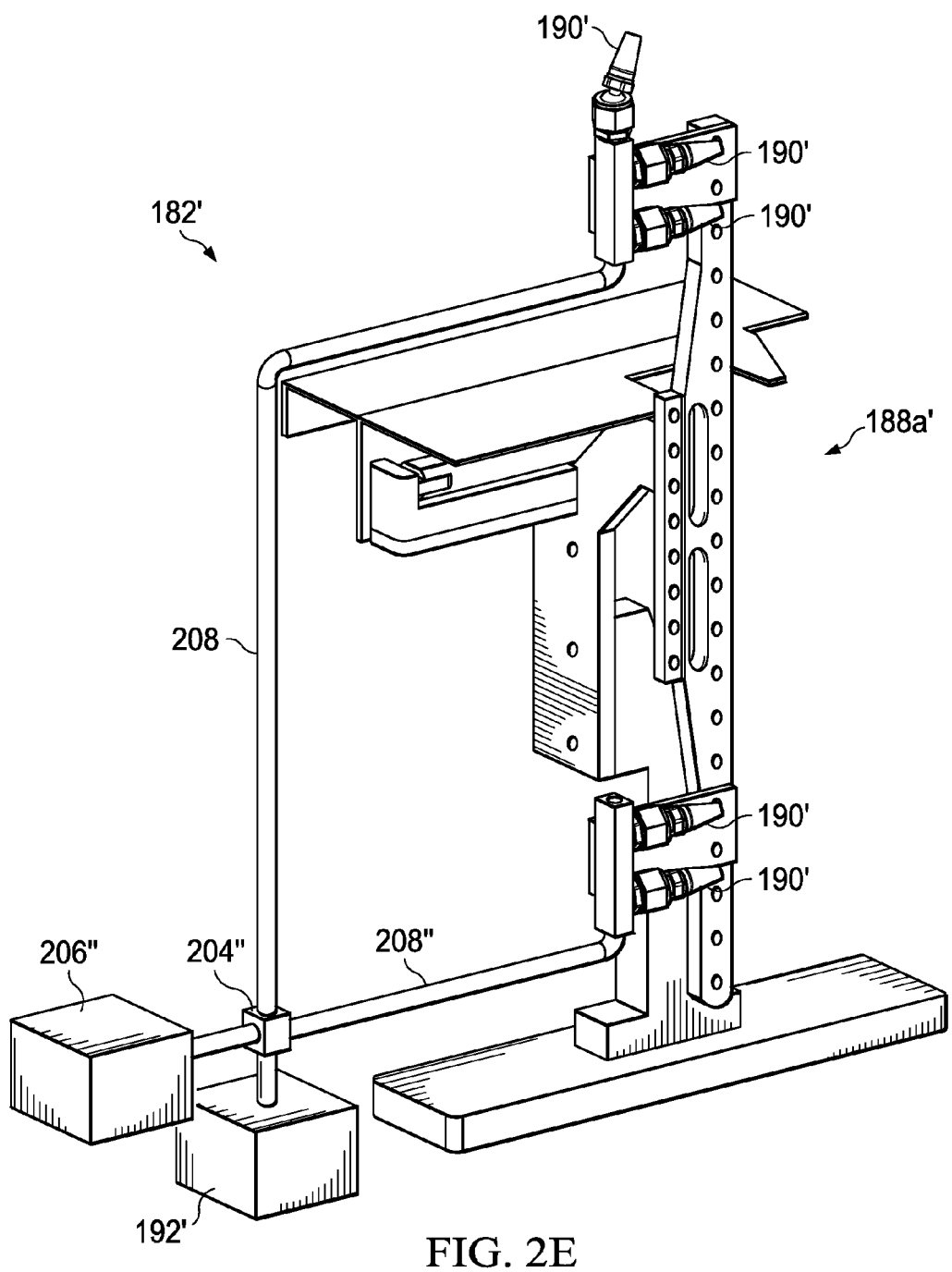

Referring now to FIG. 2E, there is shown a perspective view of an exemplary guidance device 182' in accordance with an embodiment of the present invention. The exemplary guidance device 182' shown includes the first support stand 188a' (which supports the nozzles 190'), the control unit 192' and various other components such as a valve 204" and tubing 208". The second stand 188b' which also supports one or more nozzles 190' is not shown for clarity but the second stand 188b' and associated nozzles 190' would be the same as or similar to the first stand 188a' and associated nozzles 190'. The nozzles 190' depending on the application are movable and can be attached at one or more locations on the first and second support stands 188a' and 188b'. The control unit 192' is configured to activate the nozzles 190' to emit the gas 200 which applies the local forces to the second side 194 of the glass ribbon 104 when the robot tooling device 180' moves towards the first side 186 of the glass ribbon 104. To accomplish this, the control unit 192' may interact with a sensor, some other device, or receive a digital signal from the control system of the robot tooling device 180' to know when the robot tooling device 180' is moving towards the first side 186 of the glass ribbon 104. Plus, the control unit 192' could be configured to send a signal to open one or more valves 204" (one shown) that when opened permit gas 200 to flow from a gas supply unit 206" through tubing 208" to the nozzles 190'. The control unit 192' can also be configured to send another signal to close the one or more valves 204" to stop the flow of the gas 200 to the nozzles 190'. If desired, the control unit 192' can be configured to control the valves 204" to adjust the amount of gas 200 that is supplied to the nozzles 190'. Furthermore, the control unit 192' can be configured to control and adjust the amount of gas 200 emitted from each individual nozzle 190' such that one nozzle 190' emits a different amount-pressure of the gas 200 towards the glass ribbon 104 when compared to the amount-pressure of gas 200 emitted from another one of the nozzles 190' towards the glass ribbon 104. In addition, the control unit 192' can control the timing when the gas 200 would be emitted from the all of the nozzles 190' or from different individual nozzles 190'. For instance, the control unit 192' would wait to turn on the gas 200 until after the glass ribbon 104 is adjacent to the nozzles 190' and if desired the upstream nozzles 190' could be turned-on to emit the gas 200 before the downstream nozzles 190'. Moreover, the control unit 192' can control the duration that the gas 200 is emitted by using either a fixed timing scheme or based on robot tooling suction cup 184" vacuum establishment.

Figure 2F:
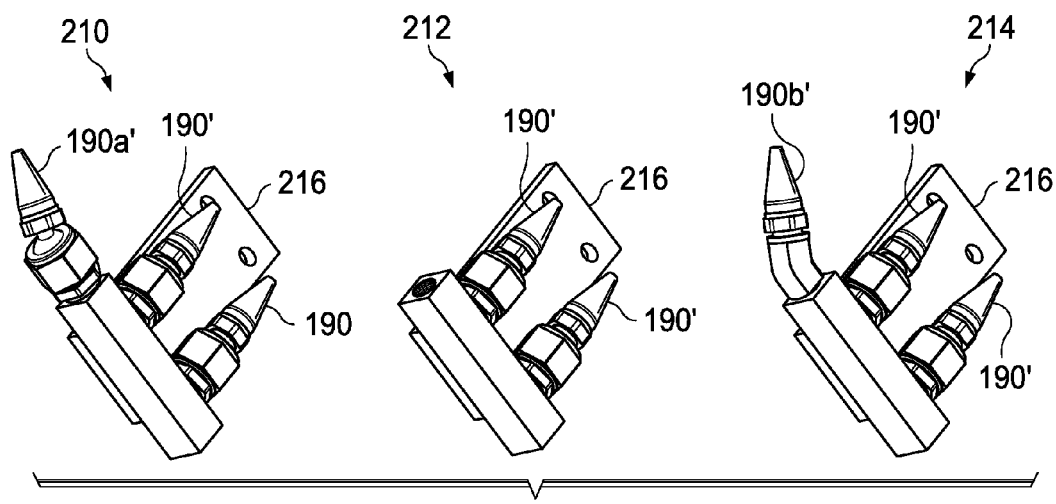

Referring now to FIG. 2F, there are shown several different exemplary nozzles arrangements 210, 212 and 214 which illustrates different ways that nozzles 190' can be arranged in accordance with different embodiments of the present invention. For instance, one nozzle arrangement 210 involves the use of two nozzles 190' and one swivel-mounted nozzle 190a' which are attached to a support plate 216 that can be attached to one of the support stands 188a' or 188b' (e.g., see FIG. 2D). Another nozzle arrangement 212 involves the use of two nozzles 190' which are attached to a support plate 216 that can be attached to one of the support stands 188a' or 188b' (e.g., see FIG. 2D). The other nozzle arrangement 214 involves the use of two nozzles 190' and one angled nozzle 190b' (e.g., mounted on a 45° elbow) which are attached to a support plate 216 that can be attached to one of the support stands 188a' or 188b'. The illustrated nozzle arrangements 210, 212 and 214 are exemplary and there many other nozzle arrangements can be used depending on the application. In any case, the nozzle arrangements 210, 212 and 214 and in particular the nozzles 190' should be able to meet the following functions:

Able to push the glass ribbon 104 from it's current position at least 50 mm towards the robot tooling device 180' within 0.5 seconds.

Able to mount the nozzles 190' a minimum distance of 100 mm from the nominal line of the glass ribbon 104 to prevent interference, touching or hitting of the nozzles 190' by the glass ribbon 104 while maintaining the pushing force.

Using an air flow rate and pressure range to safely provide the gas which is emitted from the nozzles 190' to the glass ribbon 104.

Figure 2G:
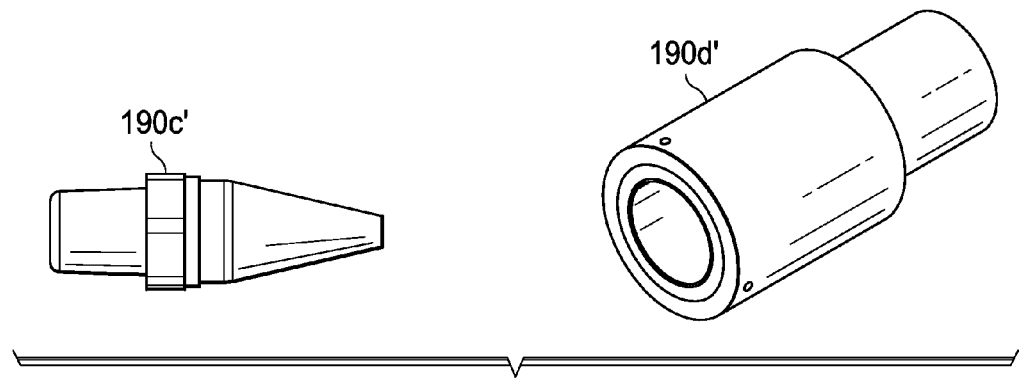

As an example, FIG. 2G has illustrations of two different types of nozzles 190' which could satisfy the above requirements but apply pressure to the glass ribbon 104 differently. The first exemplary nozzle 190c' is sold under the brand name Model #1200 Durablast and is manufactured by Vortex products. The nozzle 190c' has the following specifications:

Thrust (power) at 12 inches: 3 to 21 oz
Air Consumption: 8 to 26 SCFM
Inlet: ⅛" NPT
Pressure: 100 psig
Airstream Size: ⅝ inch
Airstream Size at 12 inches: 3½ inches In lab experiments, four of these nozzles 190c' where used in which two nozzles 190c' were located on each edge of the glass ribbon 104 and supplied with 30 psig air pressure (+/−10 psig tested range). The four nozzles 190c' easily moved the glass ribbon 104 the required amount in a repeatable fashion. This particular type of nozzle 190c' applies a focused pressure to the glass ribbon 104.

The second exemplary nozzle 190d' is sold under the brand name Model 121021 Air Amplifier and manufactured by Exair. The nozzle 190d' has desirable air volume requirements since ambient air is entrained into the air stream boosting the performance of the force and volume of the air exiting the nozzle 190d'. In addition, the nozzle 190a' has a bigger flow footprint on the glass ribbon 104 when compared to nozzle 190c' which could potentially reduce the disturbance to glass ribbon 104. In lab experiments, four of these nozzles 190d' where used in which two nozzles 190d' were located on each edge of the glass ribbon 104 and supplied with 30 psig air pressure (+/−10 psig tested range). The four nozzles 190d' easily meet the force and motion requirements to move the glass ribbon 104 into the proper position.

Referring to FIGS. 3A-3E, there are various diagrams used to help explain one embodiment of the glass ribbon engagement system 102" in accordance with the present invention. In this embodiment, the glass ribbon engagement system 102" includes a robot tooling device 180" and a guidance device 182" (e.g., see FIG. 3A's side view and FIG. 3B's top view—which illustrate a point in time where the glass ribbon 104 has not yet been engaged by the robot tooling device 180" and the guidance device 182" is not activated except that some optional fixed wheels 306" may contact the second side 194 of the glass ribbon 104). The robot tooling device 180" has suction cups 184" (e.g., four suction cups 184") which are configured to engage a first side 185 of the glass ribbon 104. The guidance device 182" includes a first support stand 188a" (which has attached thereto one or more cylinder-wheel units 190"), a second stand 188b" (which has attached thereto one or more cylinder-wheel units 190'), and a control unit 192". The first stand 188a" and the second stand 188b" may be part of the same structure or distinct structures. In any case, there would be one or more cylinder-wheel units 190" adjacent to one edge of the glass ribbon 104 and one or more cylinder-wheel units 190" adjacent to another edge of the glass ribbon 104. The cylinder-wheel units 190" are positioned such that the cylinders 302" when activated are configured to move and push-outward the respective wheels 304" so they contact and apply one or more local forces to the second side 194 of the glass ribbon 104 to shift the glass ribbon 104 towards the suction cups 184" and assist the suction cups 184" in engaging and securing the first side 186 of the glass ribbon 104 (see FIG. 3C which illustrates the activated guidance device 182" shifting the glass ribbon 104 towards the robot tooling device 180"). For instance, the cylinders 302" used would have a very low friction and the cylinder-wheel push force could be accurately controlled through pressure control (see discussion below). If desired, the cylinder-wheel units 190" may further include fixed wheels 306" which may if needed engage the second side 194 of the glass ribbon 104 before the cylinder(s) 302" are activated to move and push-outward their respective wheels 304" to contact and apply the local forces to the second side 194 of the glass ribbon 104. The control unit 192" is configured to activate the cylinders 302" to push-out and move their corresponding wheels 304" and apply the local forces to the second side 194 of the glass ribbon 104 when the robot tooling device 180" moves towards the first side 186 of the glass ribbon 104. Once, the suction cups 184" have engaged and secured the first side 185 of the glass ribbon 104 with the aid of the guidance device 182" then if desired the suction cups 184" can apply a side tension and flatten the glass ribbon 104. At this point, the TAM 170 is activated where the mechanical scoring device 172 moves to score the glass ribbon 104 so the secured glass ribbon 104 can be separated from a remaining portion of the glass ribbon 104 through bending by the robot tooling device 180" to produce the individual glass sheet 106 (see FIG. 3D which illustrates the robot tooling device 180" handling the individual glass sheet 106).

Figure 3A:
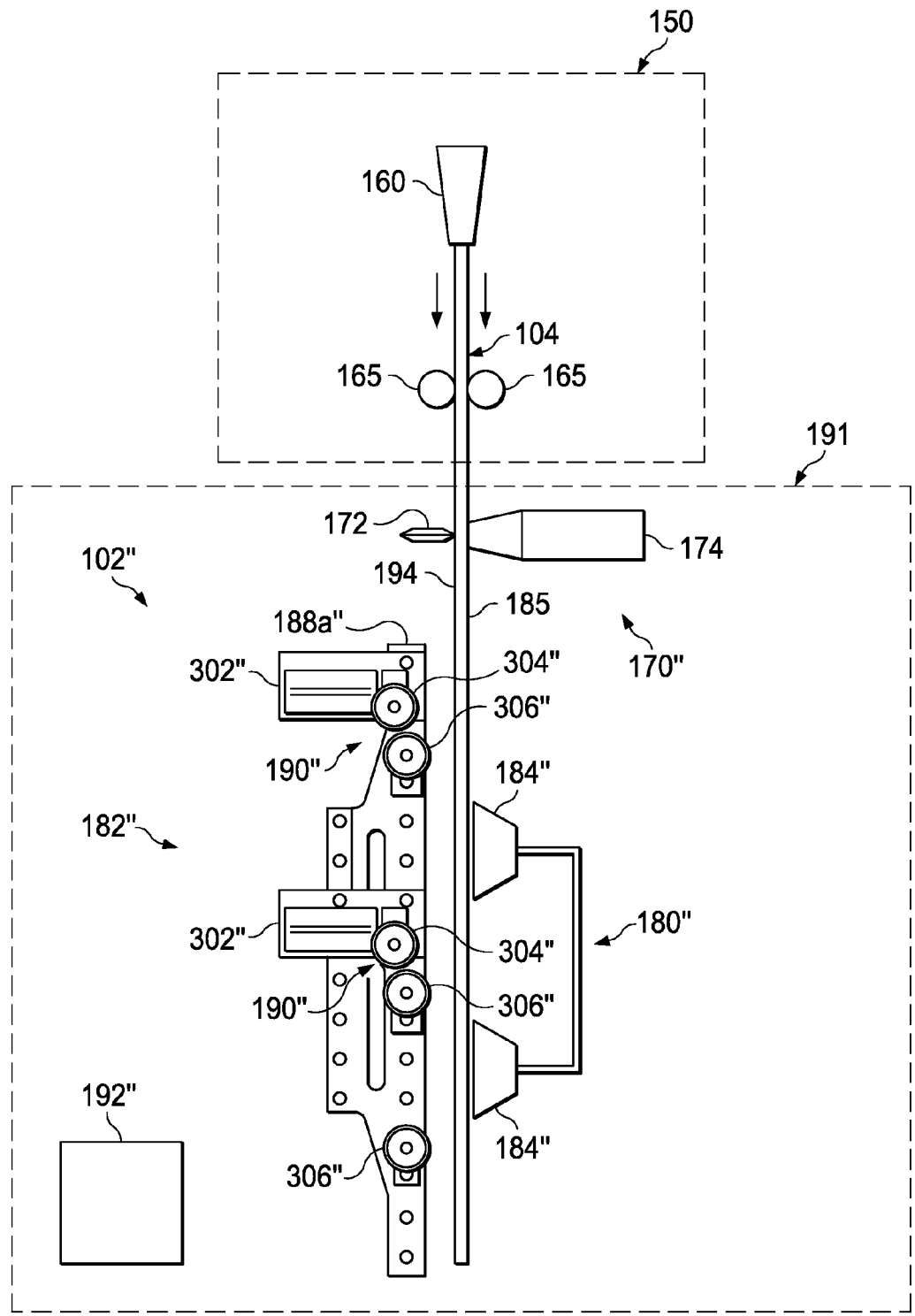
FIGS. 3A-3E are various diagrams used to help explain another embodiment of the glass ribbon engagement system shown in FIGS. 1A-1B in accordance with the present invention.
Figure 3B:
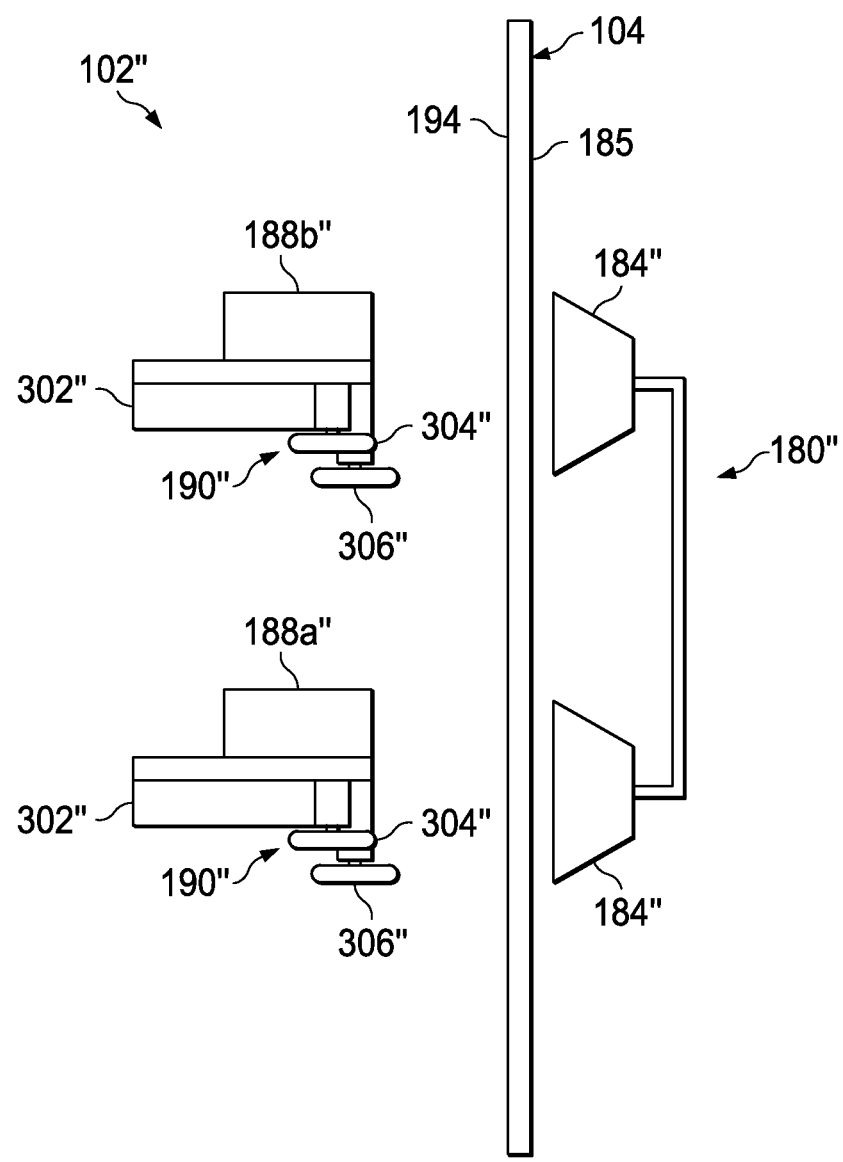
Figure 3C:
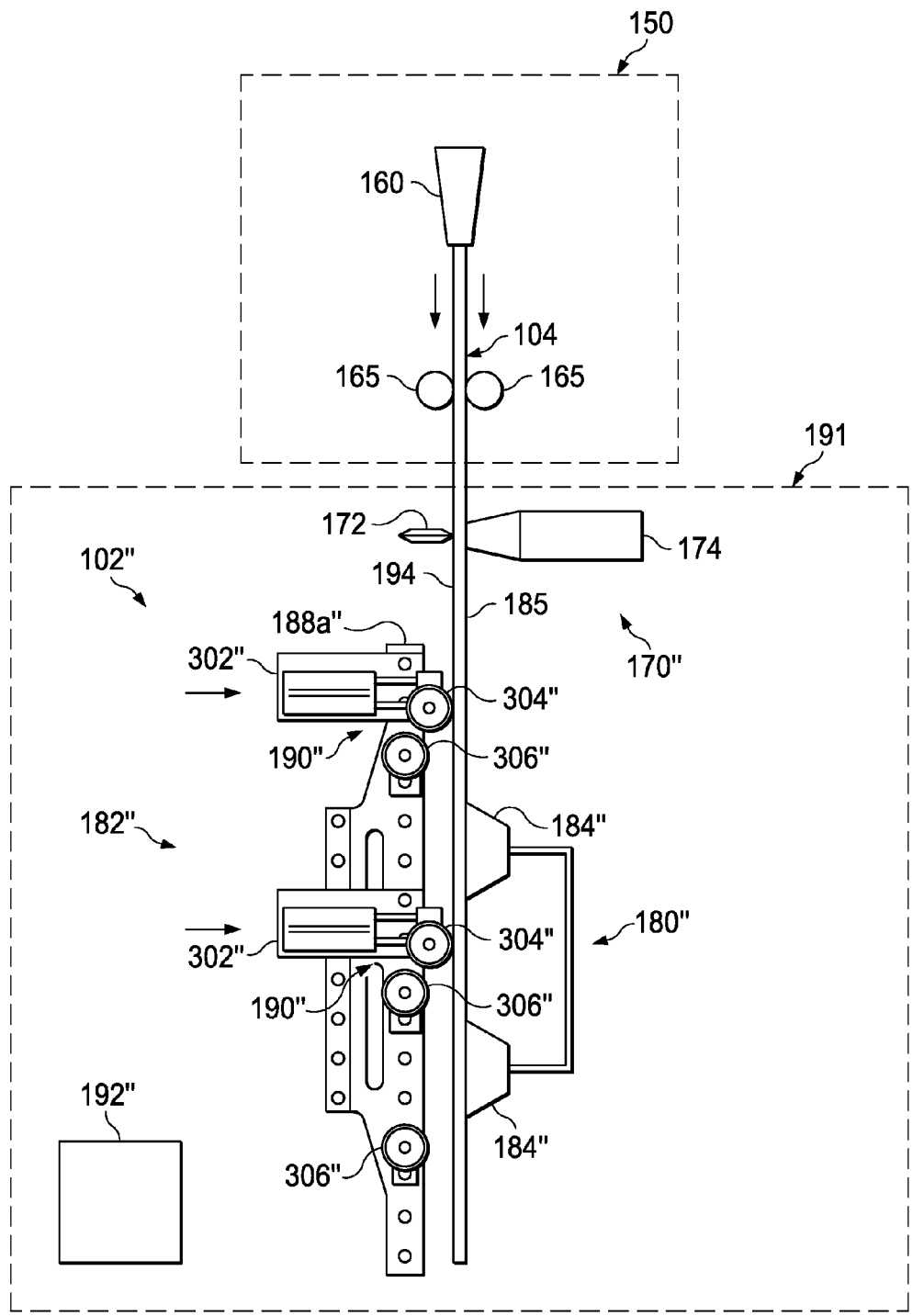
Figure 3D:
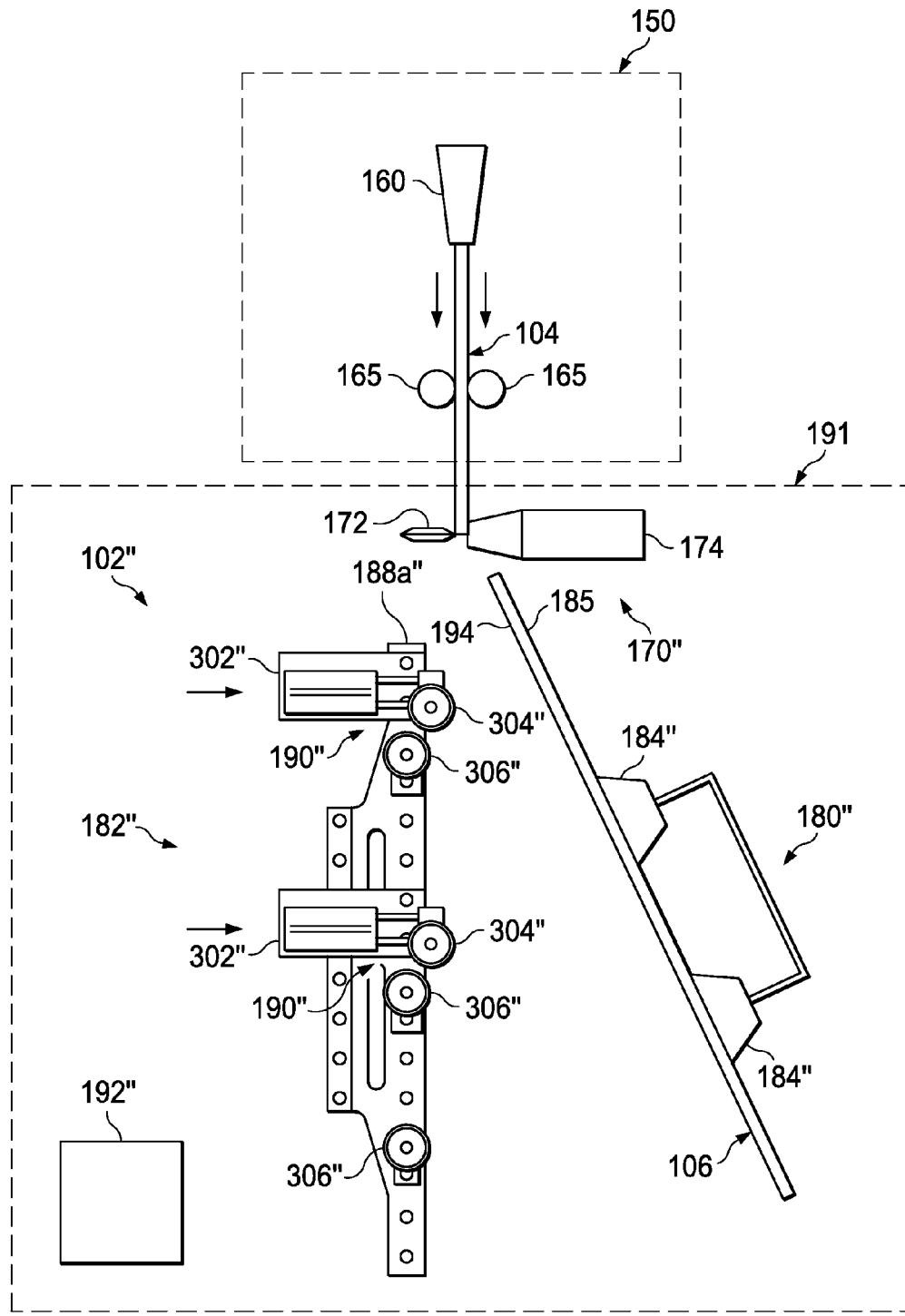
Figure 3E:
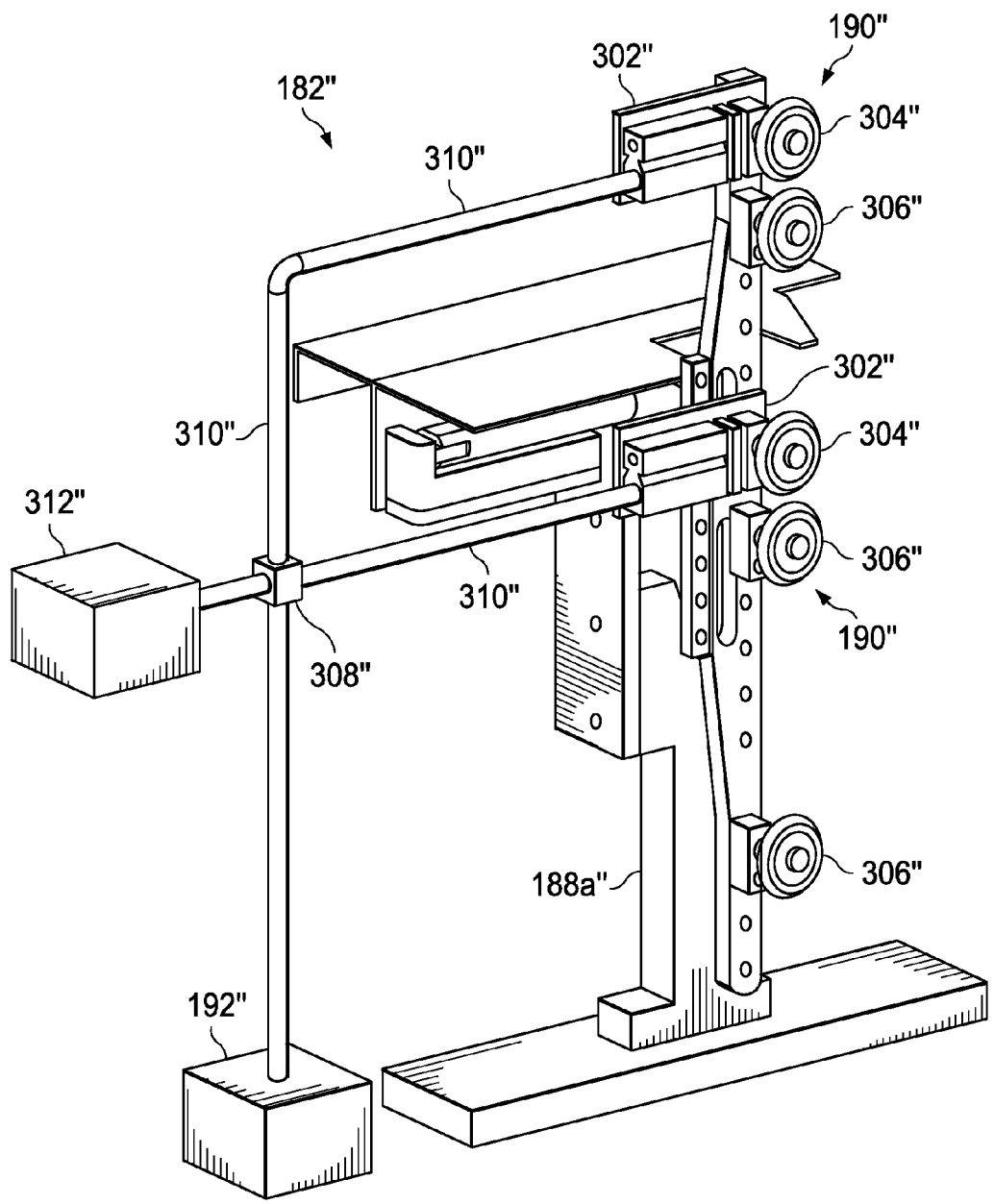

Referring now to FIG. 3E, there is shown a perspective view of an exemplary guidance device 182" in accordance with an embodiment of the present invention. The exemplary guidance device 182" shown includes the first support stand 188a" (which supports the cylinder-wheel units 190"), the control unit 192" and various other components such as a valve 308" and tubing 310". The second stand 188b" which also supports one or more cylinder-wheel units 190" is not shown for clarity but the second stand 188b" and associated cylinder-wheel units 190" would be the same as or similar to the first stand 188a" and associated cylinder-wheel units 190". The cylinder-wheel units 190" depending on the application are movable and can be attached at one or more desired locations on the first and second support stands 188a" and 188b". The control unit 192" is configured to activate the cylinders 302" to move and push-outward their corresponding wheels 304" which apply the local forces to the second side 194 of the glass ribbon 104 when the robot tooling device 180" moves towards the first side 186 of the glass ribbon 104. To accomplish this, the control unit 192" may interact with a sensor, some other device, or receive a digital signal from the control system of the robot tooling device 180" to know when the robot tooling device 180" is moving towards the first side 186 of the glass ribbon 104. Plus, the control unit 192" can be configured to send an electrical signal to the cylinders 302" which are then activated to push-forward (using a spring) the wheels 304" and send another electrical signal or discontinue the previously sent electrical signal to pull-back the wheels 304". Alternatively, the control unit 192" could be configured to send a signal to open one or more valves 308" (one shown) that when open permit gas to flow from a gas supply unit 312" through tubing 310" to the cylinders 302" to move and push-outward the wheels 304". The control unit 192" can also be configured to send another signal to close the one or more valves 308" to stop the flow of the gas to the cylinders 302" to move-back the wheels 304". If desired, the control unit 192" can be configured to control the valves 302" to adjust the amount of gas that is supplied to the cylinders 302". Furthermore, the control unit 192" can be configured to adjust the amount of gas supplied to each cylinder 302" to control how far and/or with what force the respective wheels 304" are moved towards the second side 194 of the glass ribbon 104. In addition, the control unit 192" can control the timing when all of the cylinders 302" or different individual cylinders 302" would be activated to push-outward the wheels 304". For instance, the control unit 192" could wait to turn on the gas 200 until after the glass ribbon 104 is adjacent to the cylinder-wheel units 190" and if desired the upstream cylinder-wheel units 190" could be turned-on to contact the glass ribbon 104 before the downstream cylinder-wheel units 190" are turned-on to contact the glass ribbon 104.

The illustrated cylinder-wheel units 190" are exemplary and there many other arrangements that can be used depending on the application. In any case, the cylinder-wheel units 190" themselves should be able to meet the following functions:

Able to push the glass ribbon 104 from it's current position at least 50 mm towards the robot tooling device 180" within 0.5 seconds Able to mount the wheels 304" a minimum distance of 100 mm from the nominal line of the glass ribbon 104 to prevent interference, touching or hitting of the wheels 304" by the glass ribbon 104 until the cylinders 302" are activated.

Using an air flow rate and pressure range to safely activate the cylinders 302" and push-out the respective wheels 304" to contact the glass ribbon 104.

In view of the foregoing, one will appreciate that in one of its simplest forms the present invention relates to the guidance device 182 which includes air nozzles 190' or cylinder-wheel units 190" with compliant supports 188a and 188b that assist the robot tooling device 180 with the glass ribbon engagement without glass ribbon over constraint and frequent adjustment. The guidance device 182 ensures the engagement of the robot vacuum suction cups 184 with the glass ribbon 104 (curved glass ribbon 104) by applying local pressure or force to glass ribbon 104 and shifting the glass ribbon 104 towards the suction cups 184. The robot tooling device 180 can then apply side tension and flatten the glass ribbon 104 just prior to performing scoring and break-off operation at the BOD 191. The force is delivered to the glass ribbon 104 via the nozzles 190' delivering compressed air or the wheels 304" applying mild air or mechanical spring force. The nozzles 190' or wheels 304" are activated as the robot tooling device 180 moves toward the glass ribbon 104.

Several embodiments of the compliant ribbon guidance device 182 have been described herein and these embodiments can be utilized to compensate for different compliant glass ribbons 104 and different configurations of the robot tooling device 182. In this regard, the robot tooling device 180 can be any device which has suction cups 184 that can secure the glass ribbon 104. In addition, the robot tooling device 182 can be configured to travel vertically with the glass ribbon 104 while the ribbon guidance device 182 would not travel vertically with the glass ribbon 104.

In addition, the glass ribbon engagement system 102 has been described above as being incorporated in a glass manufacturing system 100 that uses a fusion process to manufacture the glass ribbon 104. It should be understood that the glass ribbon engagement system 102 could be incorporated within and used by any type of glass manufacturing system. For example, the glass ribbon engagement system 102 can be used in combination with a fusion draw, slot draw, down draw, and other glass sheet forming methods which have continuous glass sheet forming and separation processes. Accordingly, the glass ribbon engagement system 102 of the present invention should not be construed in a limited manner. Furthermore, it should be appreciated that the FIGURES provided herein are not to scale. For example, the guidance device 182 shown in FIGS. 2B and 3B could have the support stands 188a and 188b located closer to the edges of the glass ribbon 104.

There are many advantages that the glass ribbon engagement system 102 has in aiding in the scoring and separating process of the glass ribbon 104. Some of these advantages which are associated with the glass ribbon engagement system 102 are as follows:

1. The recent trends in the Liquid Crystal Display (LCD) glass business have been to progressively wider Gen size and more recently a concomitant move to thinner glass sheets. Both of these trends (wider and thinner glass sheets) significantly reduce the inherent stiffness of the glass ribbon and make the forming process more sensitive to the BOD operations. For example, at the BOD 191, thin or large size glass ribbon tend to have a more severely curved shape (3D) which makes robot tooling suction cup engagement more difficult. Plus, glass ribbon flattening by the robot tooling suction cups becomes critical for stable scoring and separation process. This situation creates many challenges and one of particular interest that is addressed by the glass ribbon engagement system 102 is to ensure the robot tooling device 180 has a consistent engagement with the three dimensional glass ribbon 104. A consistent robot tooling device 180 and glass ribbon 104 engagement is important for the stability and capability of scoring and separating the glass ribbon 104 into glass sheets 106. The disclosed guidance device 182 helps accomplish this by translating the glass ribbon 104 toward the robot suction cups 184 allowing the ribbon suction cups 184 to pull vacuum on the three dimensional glass ribbon 184 with variant cup to ribbon surface gaps consistently. In this way, the robot tooling device 182 can more reliably acquire and side tension the glass ribbon 104. As a result, the glass ribbon 104 is held in a more planer configuration against the nosing 174 so the scoring and bending separation processes are more consistent and stable, reducing missed glass sheets and potential crackouts and rubicons. An added advantage is fewer disturbances to forming process stability from BOD.

2. The nozzle type, nozzle location, cylinder-wheel type, cylinder-wheel location and actuation sequence associated with the guidance device 182 can be optimized to enhance the effectiveness of glass ribbon 104 and robot tooling suction cup 184 engagement while minimizing the glass ribbon motion impact at the setting zone which is located downstream just below the forming apparatus 160.

3. The guidance device 182 improves the ability of the robot tooling device 180 to grasp a three dimensional bowed glass ribbon 104 as it traverses down into the BOD 191. The bowed glass ribbon 104 can have a bigger out-of-plane deformation with low stiffness due to decreasing thickness and increased Gen size. Furthermore, the guidance device 182 is also applicable for use with the smaller Gen size and thicker glass ribbon. For instance, the guidance device 182 may utilize the non-contact air nozzles 190' which delivers a lower force in the production of <0.5 mm thick glass ribbon 104. And, the guidance device 182 may utilize the low friction and constant force cylinder-wheel units 190" which deliver a higher force in the production of ≥0.5 mm thick glass ribbon 104. In any case, the guidance device 182 in general reduces the acquisition time (vacuum time) and variability of that time for the robot tooling suction cup 184 to grasp the glass ribbon 104. Plus, the sheet separation process stability (scoring and bending separation) can be improved significantly.

4. The guidance device 182 provides a more controlled separation process, thus minimizing the risk of a crack out which can result in a Rubicon and substantial loss of production in the standard fusion forming glass manufacturing process.

5. The guidance device 182 utilizes compliant nozzles 190' and/or cylinder-wheel units 190" (if desired the guidance device 182 could use both nozzles 190' and cylinder-wheel units 190") and as a result this widens the robot tooling device 180 and glass ribbon 104 engagement process time window. Furthermore, the guidance device 182 has a configuration which would be insensitive to glass ribbon position and shape shifting as normally observed in a fusing forming process. It is also expected that the guidance device 182 could have a positive impact on glass ribbon stabilization and forming process stability. Moreover, the guidance device 182 could be used to compensate or reduce the motion of the glass ribbon 104 at the setting zone (below the forming apparatus 160) during the glass ribbon growth and vertical shape "collapse" stage.

Although several embodiments of the present invention have been illustrated in the accompanying Drawings and described in the foregoing Detailed Description, it should be understood that the invention is not limited to the disclosed embodiments, but is capable of numerous rearrangements, modifications and substitutions without departing from the invention as set forth and defined by the following claims.

The invention claimed is:

1. A glass manufacturing system to form a glass ribbon from a quantity of molten glass comprising a scoring device that scores the glass ribbon and a glass ribbon engagement system that engages and secures the glass ribbon as the glass ribbon is being continuously drawn from the quantity of molten glass, the glass ribbon engagement system comprising:

a robot tooling device that includes a plurality of suction cups positioned downstream from the scoring device to engage a first side of the glass ribbon; and a guidance device that includes a support stand and one or more nozzles which are secured to the support stand, where the one or more nozzles are positioned downstream from the scoring device and oriented to emit gas to apply one or more local forces to a second side of the glass ribbon to shift the glass ribbon towards the suction cups to assist the suction cups in engaging and securing the first side of the glass ribbon.

2. The glass manufacturing system of claim 1, wherein the one or more nozzles are positioned at least a minimum of 100 mm away from the second side of the glass ribbon.

3. The glass manufacturing system of claim 1, further comprising a control unit to activate the one or more nozzles to emit the gas to apply the one or more local forces to the second side of the glass ribbon when the robot tooling device moves towards the first side of the glass ribbon.

4. The glass manufacturing system of claim 1, wherein the guidance device further includes an additional support stand and one or more devices which are secured to the additional support stand, where the one or more devices include at least one of one or more nozzles and one or more cylinder wheel units that are positioned downstream from the scoring device and oriented to apply one or more local forces to the second side of the glass ribbon to shift the glass ribbon towards the suction cups to assist the suction cups in engaging and securing the first side of the glass ribbon.

5. The glass manufacturing system of claim 1, wherein the suction cups in addition to engaging the first side of the glass ribbon also apply a side tension and flatten the glass ribbon.

6. A glass manufacturing system comprising:
   at least one vessel for melting batch materials and forming molten glass;
   a forming vessel for receiving the molten glass and forming a glass ribbon;
   a pull roll assembly for drawing the glass ribbon;
   a traveling anvil machine for receiving the glass ribbon; and
   a glass ribbon engagement system that engages and secures the glass ribbon downstream from the traveling anvil machine, the glass ribbon engagement system comprising:
   a robot tooling device that includes a plurality of suction cups positioned downstream from the traveling anvil machine to engage a first side of the glass ribbon; and
   a guidance device that includes a support stand and one or more nozzles which are secured to the support stand, where the one or more nozzles are positioned downstream from the traveling anvil machine and oriented to emit gas to apply one or more local forces to a second side of the glass ribbon to shift the glass ribbon towards the suction cups to assist the suction cups in engaging and securing the first side of the glass ribbon, where after the suction cups have engaged and secured the first side of the glass ribbon then the traveling anvil machine scores the glass ribbon and the robot tooling device separates the secured glass ribbon from a remaining portion of the glass ribbon.

7. The manufacturing system of claim 6, further comprising a control unit to activate the one or more nozzles to emit the gas to apply the one or more local forces to the second side of the glass ribbon when the robot tooling device moves towards the first side of the glass ribbon.

8. The glass manufacturing system of claim 6, wherein the guidance device further includes an additional support stand and one or more devices which are secured to the additional support stand, where the one or more devices include at least one of one or more nozzles and one or more cylinder wheel units that are positioned downstream from the traveling anvil machine and oriented to apply one or more local forces to the second side of the glass ribbon to shift the glass ribbon towards the suction cups to assist the suction cups in engaging and securing the first side of the glass ribbon.

9. The glass manufacturing system of claim 6, wherein the suction cups in addition to engaging the first side of the glass ribbon also apply a side tension and flatten the glass ribbon.

10. A glass ribbon engagement system that engages and secures a glass ribbon, the glass ribbon engagement system comprising:
    a robot tooling device that includes a plurality of suction cups configured to engage a first side of the glass ribbon; and
    a guidance device that includes a support stand and one or more devices which are secured to the support stand, where the one or more devices are positioned and configured to apply one or more local forces to a second side of the glass ribbon to shift the glass ribbon towards the suction cups to assist the suction cups in engaging and securing the first side of the glass ribbon, wherein
    the one or more devices include one or more nozzles that emit gas to apply the one or more local forces to the second side of the glass ribbon to shift the glass ribbon towards the suction cups to assist the suction cups in engaging and securing the first side of the glass ribbon, and wherein
    the one or more nozzles are positioned at least a minimum of 100 mm away from the second side of the glass ribbon.

11. A glass manufacturing system to form a glass ribbon from a quantity of molten glass comprising a scoring device that scores the glass ribbon and a glass ribbon engagement system that engages and secures the glass ribbon as the glass ribbon is being continuously drawn from the quantity of molten glass, the glass ribbon engagement system comprising:
    a robot tooling device that includes a plurality of suction cups positioned downstream from the scoring device to engage a first side of the glass ribbon; and
    a guidance device that includes a support stand and one or more cylinder-wheel units which are secured to the support stand, where the one or more cylinder-wheel units are positioned downstream from the scoring device and oriented to move one or more corresponding wheels to contact and apply one or more local forces to a second side of the glass ribbon to shift the glass ribbon towards the suction cups to assist the suction cups in engaging and securing the first side of the glass ribbon.

12. The glass manufacturing system of claim 11, wherein the one or more cylinder-wheel units in addition to the one or more corresponding wheels further includes one or more fixed wheels which engage the second side of the glass ribbon before the one or more cylinders are activated to move the one or more corresponding wheels to contact and apply the one or more local forces to the second side of the glass ribbon to shift the glass ribbon towards the suction cups to assist the suction cups in engaging and securing the first side of the glass ribbon.

13. The glass manufacturing system of claim 11, further comprising a control unit to activate the one or more cylinders to move the one or more corresponding wheels to contact and apply the one or more local forces to the second side of the glass ribbon when the robot tooling device moves towards the first side of the glass ribbon.

14. The glass manufacturing system of claim 11, wherein the guidance device further includes an additional support stand and one or more devices which are secured to the additional support stand, where the one or more devices include at least one of one or more nozzles and one or more cylinder wheel units that are positioned downstream from the scoring device and oriented to apply one or more local forces to the second side of the glass ribbon to shift the glass ribbon towards the suction cups to assist the suction cups in engaging and securing the first side of the glass ribbon.

15. The glass manufacturing system of claim 11, wherein the suction cups in addition to engaging the first side of the glass ribbon also apply a side tension and flatten the glass ribbon.

16. A glass manufacturing system comprising:
- at least one vessel for melting batch materials and forming molten glass;
- a forming vessel for receiving the molten glass and forming a glass ribbon;
- a pull roll assembly for drawing the glass ribbon;
- a traveling anvil machine for receiving the glass ribbon; and
- a glass ribbon engagement system that engages and secures the glass ribbon downstream from the traveling anvil machine, the glass ribbon engagement system comprising:
- a robot tooling device that includes a plurality of suction cups positioned downstream from the traveling anvil machine to engage a first side of the glass ribbon; and
- a guidance device that includes a support stand and one or more cylinder-wheel units which are secured to the support stand, where the one or more cylinder-wheel units are positioned downstream from the traveling anvil machine and oriented to move one or more corresponding wheels to contact and apply one or more local forces to a second side of the glass ribbon to shift the glass ribbon towards the suction cups to assist the suction cups in engaging and securing the first side of the glass ribbon, where after the suction cups have engaged and secured the first side of the glass ribbon then the traveling anvil machine scores the glass ribbon and the robot tooling device separates the secured glass ribbon from a remaining portion of the glass ribbon.

17. The manufacturing system of claim 16, further comprising a control unit to activate the one or more cylinder-wheel units to move the one or more corresponding wheels to apply the one or more local forces to the second side of the glass ribbon when the robot tooling device moves towards the first side of the glass ribbon.

18. The glass manufacturing system of claim 16, wherein the guidance device further includes an additional support stand and one or more devices which are secured to the additional support stand, where the one or more devices include at least one of one or more nozzles and one or more cylinder wheel units that are positioned downstream from the traveling anvil machine and oriented to apply one or more local forces to the second side of the glass ribbon to shift the glass ribbon towards the suction cups to assist the suction cups in engaging and securing the first side of the glass ribbon.

19. The glass manufacturing system of claim 16, wherein the suction cups in addition to engaging the first side of the glass ribbon also apply a side tension and flatten the glass ribbon.

* * * * *